(12) United States Patent
Long et al.

(10) Patent No.: US 10,373,786 B2
(45) Date of Patent: Aug. 6, 2019

(54) MAGNETIC SWITCH WITH MAINTENANCE OVERRIDE

(71) Applicant: C&D ZODIAC, INC., Huntington Beach, CA (US)

(72) Inventors: Eric Long, Huntington Beach, CA (US); Karim Salha, Huntington Beach, CA (US)

(73) Assignee: C&D ZODIAC, INC., Huntington Beach, CA (US)

( * ) Notice: Subject to any disclaimer, the term of this patent is extended or adjusted under 35 U.S.C. 154(b) by 355 days.

(21) Appl. No.: 15/409,387

(22) Filed: Jan. 18, 2017

(65) Prior Publication Data

US 2017/0207046 A1    Jul. 20, 2017

Related U.S. Application Data

(60) Provisional application No. 62/280,501, filed on Jan. 19, 2016.

(51) Int. Cl.
| | |
|---|---|
| H01H 36/02 | (2006.01) |
| H01H 36/00 | (2006.01) |
| B64C 1/14 | (2006.01) |
| B64D 11/02 | (2006.01) |
| H01H 89/00 | (2006.01) |

(Continued)

(52) U.S. Cl.
CPC ........... *H01H 36/02* (2013.01); *B64C 1/1407* (2013.01); *B64D 11/02* (2013.01); *B64D 45/0005* (2013.01); *E05B 15/0205* (2013.01); *E05B 17/10* (2013.01); *E05B 65/0035* (2013.01); *H01H 36/0013* (2013.01); *H01H 89/00* (2013.01); *E05B 2047/0069* (2013.01); *H01H 36/0046* (2013.01)

(58) Field of Classification Search
CPC ...... H01H 36/02; H01H 89/00; B64C 1/1407; B64D 11/02; B64D 45/0005
USPC .................................................. 335/205–207
See application file for complete search history.

(56) References Cited

U.S. PATENT DOCUMENTS 2,352,830 A * 7/1944 Ford ........................ G01F 23/36
                                                              200/84 R
2,495,149 A * 1/1950 Taylor ..................... G01F 23/56
                                                              200/84 C (Continued)

OTHER PUBLICATIONS

International Search Report and Written Opinion issued in PCT/US17/13982 dated Apr. 6, 2017.

*Primary Examiner* — Mohamad A Musleh
(74) *Attorney, Agent, or Firm* — Jeffer Mangels Butler & Mitchell LLP; Brennan C. Swain, Esq.

(57) ABSTRACT

A switch system that includes a switch assembly with a housing having a bottom surface that includes a latch pocket defined therein. The latch pocket includes a top surface and the housing defines an interior that includes either a magnetic switch or a magnet disposed therein. One of the magnetic switch or magnet is positioned adjacent the top surface of the latch pocket in the other is associated with the distal end of latch bolt. The system also includes a latch bolt. When the latch bolt is in the unlatched position it is not received in the latch pocket, the magnetic switch is in the first state and an electrical component is in a first state. When the latch bolt is in the latched position it is received in the latch pocket, the magnetic switch is in the second state and the electrical component is switched to a second state.

10 Claims, 4 Drawing Sheets

(51) Int. Cl.
    *B64D 45/00*     (2006.01)
    *E05B 65/00*     (2006.01)
    *E05B 15/02*     (2006.01)
    *E05B 17/10*     (2006.01)
    *E05B 47/00*     (2006.01)

(56) References Cited

U.S. PATENT DOCUMENTS

| | | | |
|---|---|---|---|
| 3,022,397 A * | 2/1962 | Goellner | G01F 23/32 |
| | | | 200/84 C |
| 3,051,805 A * | 8/1962 | Binford | G01F 1/28 |
| | | | 200/84 C |
| 3,145,277 A * | 8/1964 | Senn | G01F 23/38 |
| | | | 200/84 C |
| 3,465,271 A * | 9/1969 | Koepke | H01H 36/004 |
| | | | 335/205 |
| 3,504,316 A * | 3/1970 | Bekedam | G01F 23/56 |
| | | | 335/306 |
| 3,625,312 A * | 12/1971 | Hutner | E05B 45/083 |
| | | | 187/280 |
| 3,689,859 A * | 9/1972 | Straub | H01H 36/004 |
| | | | 335/206 |
| 4,713,889 A * | 12/1987 | Santiago | F41C 33/0227 |
| | | | 224/246 |
| 4,994,722 A | 2/1991 | Dolan | |
| 6,249,224 B1 | 6/2001 | Shoen et al. | |
| 9,428,259 B2 | 8/2016 | Savian et al. | |
| 2004/0183652 A1 | 9/2004 | Dang | |
| 2014/0111329 A1 | 4/2014 | Tearston | |

\* cited by examiner

MAGNETIC SWITCH WITH MAINTENANCE OVERRIDE

CROSS-REFERENCE TO RELATED APPLICATIONS

This application claims the benefit of U.S. Provisional Application No. 62/280,501, filed Jan. 19, 2016, which is herein incorporated by reference in its entirety.

FIELD OF THE INVENTION

The present invention relates to a magnetic switch for an aircraft lavatory door that includes a maintenance override.

BACKGROUND OF THE INVENTION

Aircraft lavatories often include the capability of having the lights turn on when the door is closed and locked and turn off when the door is opened. The present invention is a switch with this capability and that includes a maintenance override that allows the maintenance crew to bypass the magnetic switch functionality without activating it. Magnetic switches for doors are known. For example see U.S. Pat. No. 6,249,224, the entirety of which is incorporated herein by reference.

SUMMARY OF THE PREFERRED EMBODIMENTS

In accordance with a first aspect of the present invention there is provided a switch system that includes a switch assembly with a housing having a bottom surface that includes a latch pocket defined therein. The latch pocket is defined by at least four inner surfaces and a top surface and the housing defines a housing interior that includes one of a magnetic switch or a magnetic field generating device disposed therein. One of the magnetic switch or magnetic field generating device is positioned adjacent the top surface of the latch pocket and the other is associated with a distal end of the latch bolt. The magnetic switch has a first state and a second state. The system also includes a latch bolt movable between latched and unlatched positions. When the latch bolt is in the unlatched position it is not received in the latch pocket, the magnetic switch is in the first state and an electrical component (e.g., a lighting system) is in a first state (e.g., off or dim). The magnetic switch is in electrical communication with the electrical component. When the latch bolt is in the latched position it is received in the latch pocket, the magnetic switch is in the second state and the electrical component is switched to a second state (e.g., on or brighter).

In a preferred embodiment, the switch assembly further includes an override switch that is movable between a first position and a second position. When the override switch is moved to the second position the electrical component is switched to the second state, whereby the magnetic switch remains in the first state. Preferably, the housing includes a switch opening defined in the bottom surface thereof and at least a portion of the override switch extends downwardly through the switch opening. In a preferred embodiment, a bottom surface of the override switch (i.e., the lowermost point) does not extend below the bottom surface of the housing. In a preferred embodiment, the housing includes a switch indentation that least partially surrounds the switch opening.

In a preferred embodiment, the housing includes an attachment flange extending outwardly therefrom. Preferably, the magnetic switch is disposed in the housing and the magnetic field generating device is associated with the distal end of the latch bolt. In another preferred embodiment, the magnetic field generating device is disposed in the housing and the magnetic switch is associated with the distal end of the latch bolt. Preferably, the housing includes a cover that includes projections extending outwardly therefrom that cooperate with stops and a cutout defined in the housing.

In a preferred embodiment, the switch assembly is positioned in a header of a doorframe, and the latch bolt extends upwardly from a door. Preferably, the door is an aircraft lavatory door.

In accordance with another aspect of the present invention there is provided a method of switching an electrical component from a first state to a second state that includes moving a latch bolt from an unlatched position to a latched position. In the latched position, the latch bolt is received in a latch pocket defined in a housing of a switch assembly and a magnetic switch is switched from a first state to a second state. When the magnetic switch is switched to the second state, the electrical component is switched from the first state to the second state. In a preferred embodiment, the latch pocket is defined by at least four inner surfaces and a top surface. It will be appreciated that the at least four inner surfaces can be round and essentially be a cylinder. The housing defines a housing interior that includes one of the magnetic switch or a magnetic field generating device disposed therein. The magnetic switch or magnetic field generating device is positioned adjacent the top surface of the latch pocket and the other of the magnetic switch or magnetic field generating device is associated with the distal end of the latch bolt.

In a preferred embodiment, the switch assembly further comprises an override switch that is movable between a first position and a second position. When the override switch is moved to the second position the electrical component is switched to the second state and the magnetic switch remains in the first state.

The attached drawings show a magnetic switch. Preferably, the switch includes a maintenance override. In a preferred embodiment, the switch is usable in an aircraft and is compatible with a wide range of aircraft electrical architecture and various aircraft voltages. In a preferred embodiment, the switch is used as a lavatory door light switch. However, this is not a limitation and the switch can be used in any desired environment. When used in an aircraft lavatory, the switch can be embedded in a honeycomb panel, if desired. It will be appreciated that the maintenance override switch allows the maintenance crew to bypass the magnetic switch functionality without activating it.

The switch is preferably made using highly reliable electrical components to achieve the functionality discussed herein. In addition, a built in switch contact filter protection can be added to prolong the switch lifetime well into the million cycles. In a preferred embodiment, a Neodymium magnet is used to take advantage of its high strength and resistance to demagnetization to activate the switch from a distance. However, this is not a limitation and other magnets can be used.

In a preferred embodiment, the switch has the following features: Single pole double throw contacts, override maintenance switch, built in spike and contact arc protection for extended lifecycles, and a small form factor ideal for mounting inside honeycomb panel.

The invention, together with additional features and advantages thereof, may be best understood by reference to the following description.

BRIEF DESCRIPTION OF THE DRAWINGS

Like numerals refer to like parts throughout the several views of the drawings.

DETAILED DESCRIPTION OF THE PREFERRED EMBODIMENTS

Figure 1:
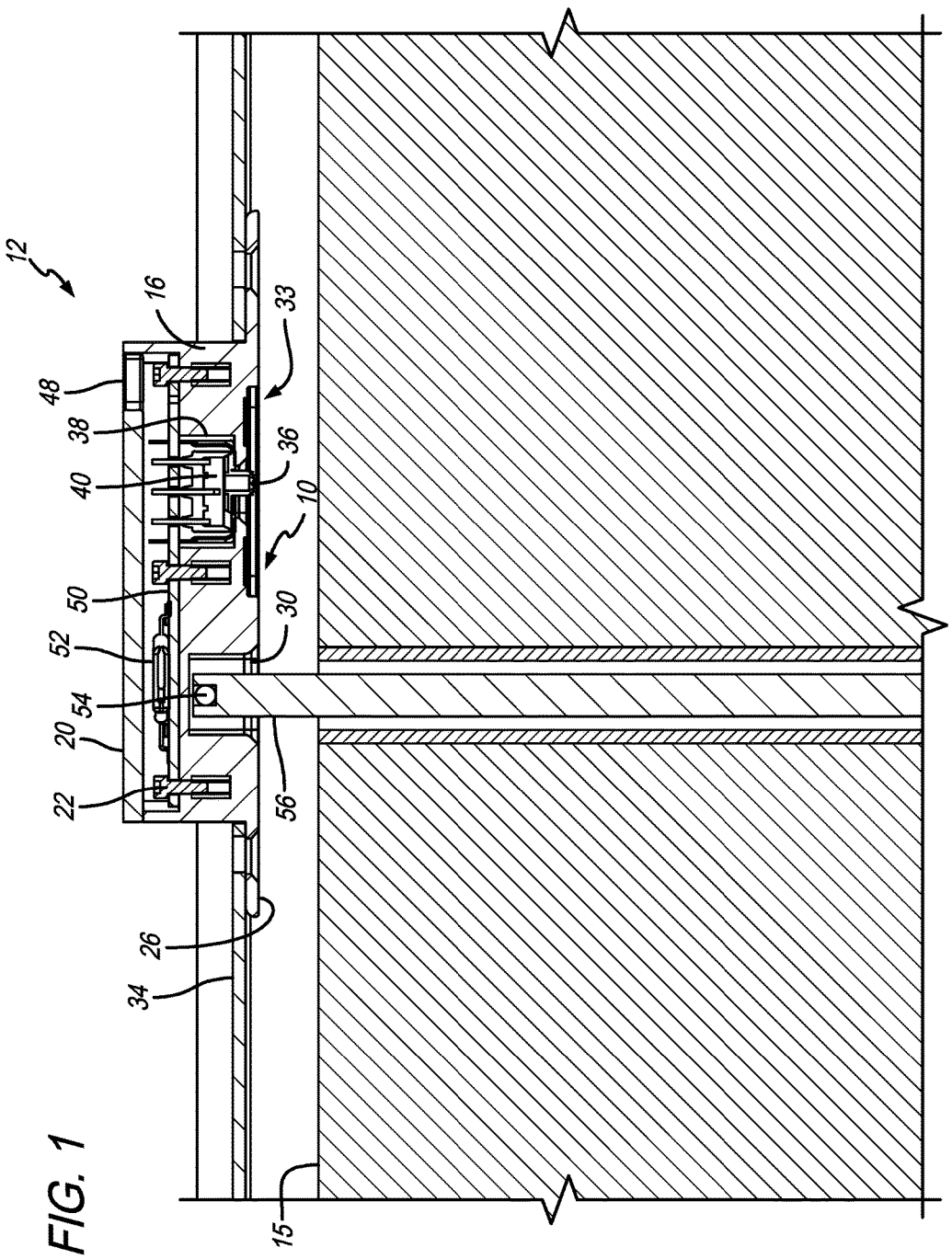
FIG. 1 is a cross-sectional front elevational view of a switch system with the switch assembly mounted in the header of the doorframe and the latch bolt extending upwardly from the door in accordance with a preferred embodiment of the present invention.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments.

Reference in this specification to "one embodiment" or "an embodiment" means that a particular feature, structure, or characteristic described in connection with the embodiment is included in at least one embodiment of the-disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein. Nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "upper," "lower," "side," "short," "long," "up," "down," and "below" used herein are merely for ease of description and refer to the orientation of the components as shown in the figures. It should be understood that any orientation of the components described herein is within the scope of the present invention.

Referring now to the drawings, which are for purposes of illustrating the present invention and not for purposes of limiting the same, FIGS. 1-5 show a preferred embodiment of a switch system 10. In a preferred embodiment, the switch system 10 is used in an aircraft lavatory. However, this is not a limitation on the present invention, and the description herein of the switch system 10 being used in an aircraft is only exemplary. In particular, in a preferred embodiment, the switch system 10 is used with the lavatory door taught in U.S. Pat. No. 9,428,259, issued on Aug. 30, 2016, the entirety of which is incorporated by reference herein.

The switch system 10 generally includes a switch assembly 12 and a latch bolt 56. In the exemplary embodiment shown in the drawings, and as shown in FIG. 1, the switch assembly 12 is mounted in the header 34 of the doorframe and the latch bolt 56 extends upwardly from the door 15. It will be appreciated that this arrangement is not a limitation on the present invention. In another embodiment, the switch assembly 12 can be mounted on the side of the doorframe (e.g., the doorjamb, etc.) and the latch bolt 56 can extend sideways from the door. In another embodiment, the switch assembly 12 can be mounted underneath the door and the latch bolt 56 can extend downwardly. In another embodiment, the switch assembly 12 can be mounted in the door and the latch bolt 56 can extend from the doorframe.

Figure 2:
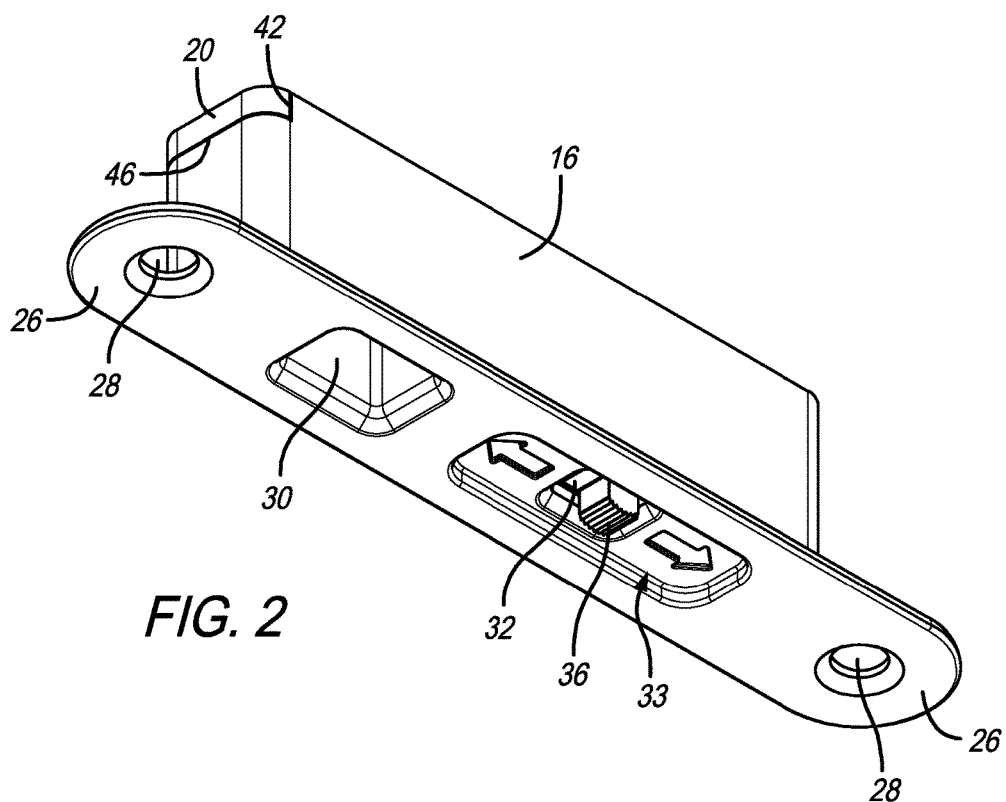
FIG. 2 is an exploded view of the switch assembly and the latch bolt.
Figure 5:
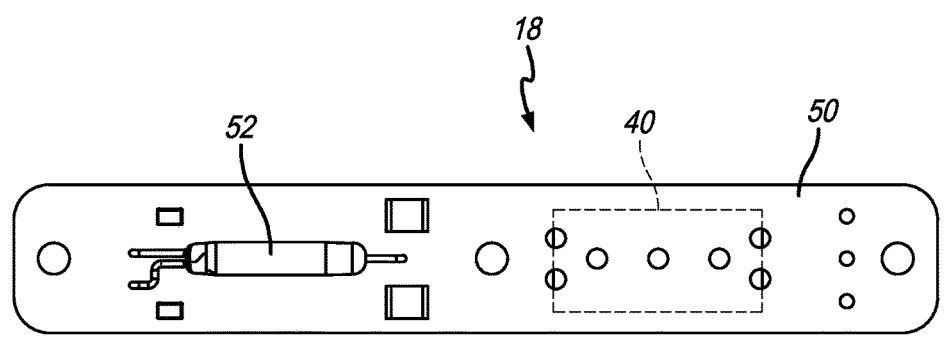
FIG. 5 is an illustration of the printed circuit board (PCB) assembly.
Figure 3:
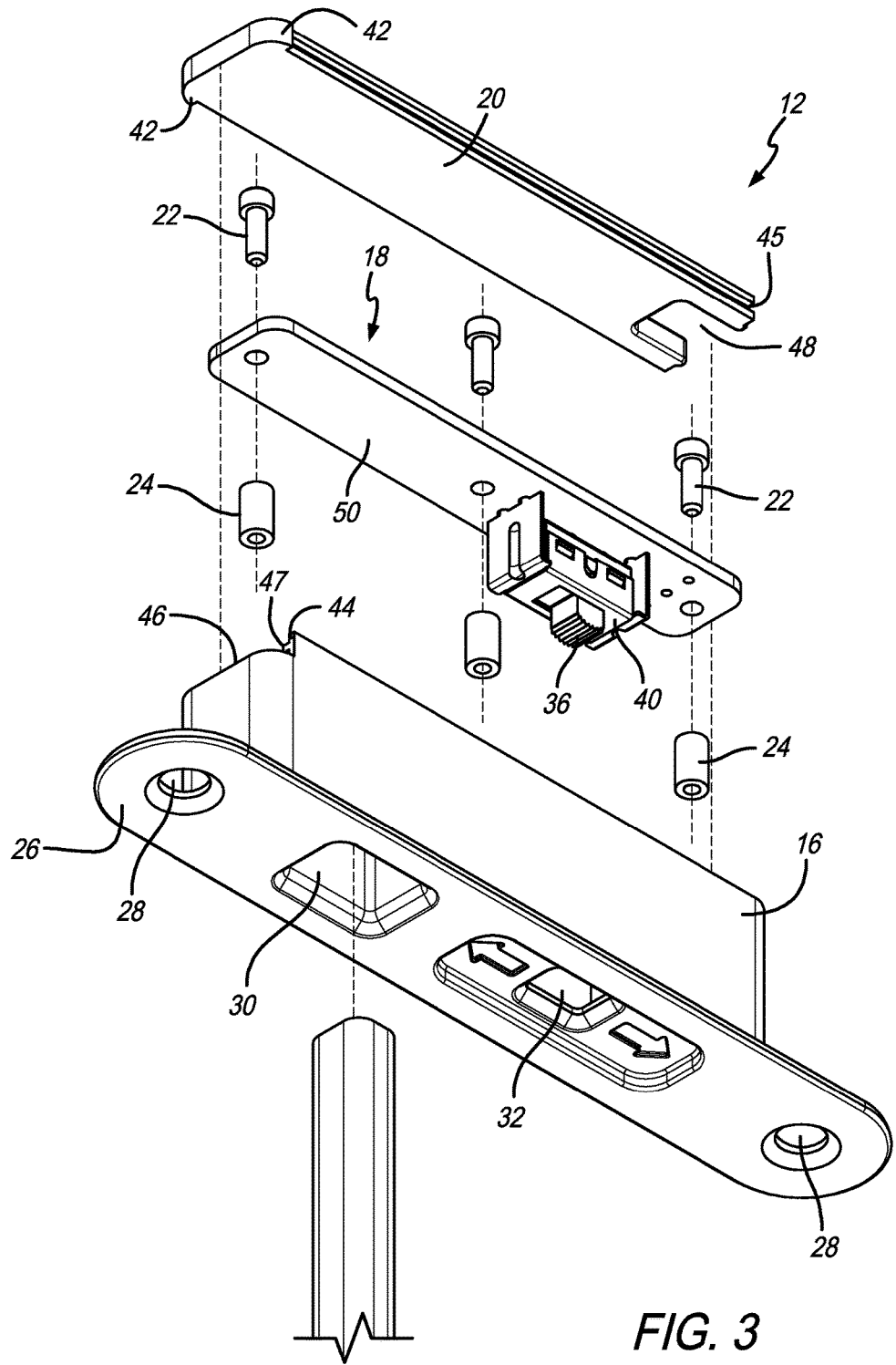
FIG. 3 is a perspective view of the switch assembly.

As shown in FIGS. 2 and 3, the switch assembly 12 generally includes a housing 16, a printed circuit board (PCB) assembly 18, a cover 20 and various components for securing the pieces together (e.g., threaded fasteners 22 and threaded inserts 24). The housing 16 includes a bottom flange 26 that has openings 28 defined therein for receiving a threaded fastener or the like for securing the housing 16 and the switch assembly 12 to the header 34 of the doorframe. In a preferred embodiment, the bottom surface of the housing 16 also includes a latch pocket 30 defined therein that extends upwardly into the housing and toward the magnetic switch 52. The latch pocket 30 is for receiving the latch bolt 56 when the latch bolt 56 is moved to the latched position. For embodiment, the latch pocket 30 includes at least four side surfaces and a top surface. The bottom surface of the housing 16 also preferably includes a switch opening 32 defined therein and through which an override switch 36 (described below) extends. It will be appreciated by those of ordinary skill in the art that one of the purposes of the latch bolt 56 being received in the latch pocket 30 is to prevent the door from being opened. In other words, when the latch bolt 56 is captured in the latch pocket 30, and because the latch bolt 56 extends downwardly into the door, the door is prevented from being opened or closed without unlatching the latch bolt 56. Preferably, the upper surface of the housing 16 includes a switch housing opening 38 defined therein that receives the override switch housing 40 associated with the maintenance override switch 36. In another embodiment, the override switch 36 can be omitted.

In a preferred embodiment, the cover 20 includes projections 42 at one end thereof that cooperate with stops 44 and a cutout 46 on the housing to help properly position the cover 20. The opposite end of the cover 20 preferably includes a wire opening 48 through which wires (not shown) extend for connecting the switch assembly 12 to the lavatory lighting or other electrical component that is to be switched on and off.

Figure 4:
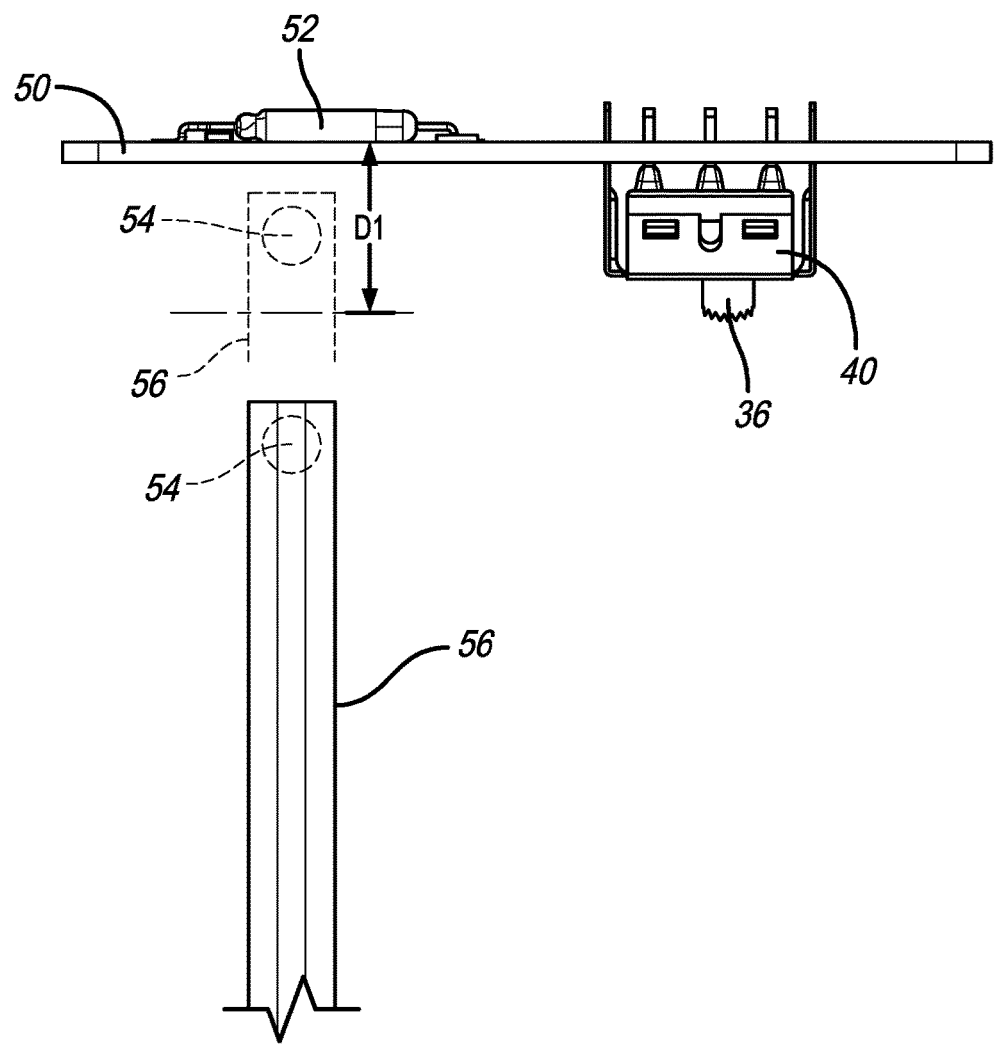
FIG. 4 is a side elevational view of the switch system with the housing removed to show the latch bolt and switch mounted on the printed circuit board assembly.

Generally, the PCB assembly 18 includes a printed circuit board (PCB) 50 with a magnetic switch 52 and the override switch housing 40 thereon. As shown in FIG. 4, in a preferred embodiment, the magnetic switch 52 is located on the top of the PCB 50 and the override switch housing 40 and override switch 36 extend downwardly from the PCB 50. In another embodiment, the magnetic switch 52 can be located on the bottom of PCB 50. It will be appreciated by those of ordinary skill in the art that the override switch 36 is preferably a toggle switch that extends through switch opening 32 such that it can be accessed from the bottom of the housing 16 and switch assembly 12. In a preferred embodiment, a switch indentation 33 that surrounds the switch opening 32 is defined in the bottom surface of the housing 16. As shown in FIG. 1, in a preferred embodiment, the lowermost point of the override switch 36 does not extend below the bottom surface of the housing 16. Therefore, the switch indentation 33, which has a larger area than the switch opening 32, allows a user to put their finger into the switch indentation 33 to toggle the switch between the on and off positions. The override switch 36 is prevented from being accidentally switched on or off or it by the closing door because it does not extend below the bottom surface of the housing 16. In another embodiment, the override switch 36 extends below the bottom surface of the housing.

The magnetic switch 52 and override switch 36 are electrically connected to an electrical component to be switched on and off. It will be appreciated that in a preferred embodiment, the electrical connection is made by wires or other electrical connections that extend between the PCB assembly 18 and the electrical component to be switched on and off.

As shown in FIG. 1, in a preferred embodiment, the PCB assembly 18 is positioned within the housing interior such that the override switch housing 40 extends downwardly into the switch housing opening 38 and the magnetic switch 52 is positioned adjacent to, aligned with or above the top surface of the latch pocket 30.

In a preferred embodiment, the latch bolt 56 includes a magnet 54 or other magnetic field generating device associated with a distal end thereof. The magnet 54 can be attached to the distal end, secured in a pocket in the distal end, embedded in the distal end or completely enclosed in the distal end of the latch bolt 56. It will be appreciated by those of ordinary skill in the art that the magnetic switch 52 is affected or switched when the magnet 54 is moved to within a predetermined distance D1 (see FIG. 4) therefrom. The distance depends on the strength of the magnetic field generated by the magnet 54. In a preferred embodiment, the magnet 54 is a neodymium magnet. However, this is not a limitation and other magnets can be used. Preferably, the magnetic switch 52 is normally open (it can also be normally closed) and when the magnet 54 is moved within a close enough proximity to affect the magnetic switch 52, the magnetic switch 52 is switched to the closed position. Generally, it will be understood that the magnetic switch has a first state where the circuit is open and a second state where the circuit is closed.

In use in the lavatory door example herein, when the door is closed and the latch bolt 56 is moved from an unlatched position to the latched position (by any type of handle or latching mechanism) the latch bolt 56 is received in latch pocket 30. When this happens, the magnet 54 located at the distal end of latch bolt 56 triggers or activates the magnetic switch 52, thereby closing the switch and turning the lights in the lavatory on. In an exemplary embodiment, the lights in the lavatory are dimmed when the door is open (or not fully closed) and the latch bolt 56 is in the unlatched position. After the door is closed and the latch bolt 56 is received in latch pocket 30 (and the magnet 54 is moved within the predetermined distance D1), the magnetic switch 52 is closed, thereby closing the circuit and turning the lights in the lavatory brighter. When the latch bolt 56 is moved out of the latch pocket 30 (and the magnet 54 is moved outside of the predetermined distance D1) the switch is released or deactivated and the lights go back to the dim state.

As discussed above, in a preferred embodiment, the lights are only bright when the door is closed. However, when maintenance or other work needs to be performed inside of the lavatory it may be desirable to have the door opened due to the confined space inside the lavatory. The override switch 36 is provided for this purpose. The override switch 36 is movable between an on and an off position. In the off position the switch is open and the magnetic switch 52 functions as described above. However, when the override switch 36 is moved to the on position, the switch is closed and the lights in the lavatory are switched to the brighter configuration (or the other connected electrical component is turned on).

It will be appreciated that other electrical components in the lavatory can be switched on or otherwise affected by the switch system 10. For example, the functionality of certain components in the lavatory can be switched on. Accordingly, the example of brightening the lights in the lavatory is not limiting on the present invention. Furthermore, as discussed above, the switch system 10 can be used in other situations and environments other than in an aircraft lavatory.

It will be appreciated that modifications to the present invention can be made. For example, in another embodiment, the magnetic switch can be located on the distal end of the latch bolt and the magnet can be located in the housing. In another embodiment, the magnetic switch can be positioned adjacent any of the side surfaces or walls of the latch pocket.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further any specific numbers noted herein are only examples: alternative implementations may employ differing values or ranges.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A switch system comprising: a switch assembly that includes a housing having a bottom surface that includes a latch pocket defined therein, wherein the latch pocket includes a top surface, wherein the housing defines a housing interior that includes a circuit board positioned above the latch pocket, wherein the circuit board includes a magnetic switch and an override switch, wherein the circuit board positions the magnetic switch adjacent the top surface of the latch pocket, wherein the magnetic switch has a first state and a second state, wherein the override switch is movable between a first position and a second position, wherein when the override switch is moved to the second position an electrical component is switched to a second state, whereby the magnetic switch remains in the first state, wherein the override switch extends from an override switch housing that is connected to the circuit board, wherein the housing includes a switch opening defined in the bottom surface thereof, wherein the circuit board positions the override housing such that at least a portion of the override switch extends downwardly through the switch opening, and wherein the housing includes a cover that is positioned above the circuit board, a latch bolt movable between a latched position and an unlatched position, wherein a magnetic field generating device is associated with a distal end of the latch bolt, wherein when the latch bolt is in the unlatched position the distal end and the magnetic field generating device are not positioned in the latch pocket and the magnetic switch is in the first state, whereby the electrical component is in a first state, and wherein when the latch bolt is in the latched position the distal end and the magnetic field generating device are positioned in the latch pocket and the magnetic switch is in the second state, whereby the electrical component is switched to the second state.

2. The switch system of claim 1 wherein a bottom surface of the override switch does not extend below the bottom surface of the housing.

3. The switch system of claim 2 wherein the housing includes a switch indentation that least partially surrounds the switch opening.

4. The switch system of claim 1 wherein the housing includes an attachment flange extending outwardly therefrom.

5. The switch system of claim 1 wherein the cover includes projections extending outwardly therefrom that cooperate with stops and a cutout defined in the housing.

6. The switch system of claim 1 wherein the switch assembly is positioned in a header of a doorframe, and wherein the latch bolt extends upwardly from a door.

7. The switch system of claim 6 wherein the door is an aircraft lavatory door.

8. The switch system of claim 1 wherein the latch pocket and the switch opening are both defined in the bottom surface of the housing.

9. A method of switching an electrical component from a first state to a second state, the method comprising: moving a latch bolt from an unlatched position to a latched position, wherein the latch bolt includes a distal end that includes a magnetic field generating device therein, wherein in the latched position, the distal end of the latch bolt is received in a latch pocket defined in a housing of a switch assembly and a magnetic switch is switched from a first state to a second state, wherein when the magnetic switch is switched to the second state, the electrical component is switched from the first state to the second state, wherein the latch pocket includes a top surface, wherein the housing defines a housing interior that includes a circuit board positioned above the latch pocket, wherein the circuit board includes the magnetic switch and an override switch, wherein the circuit board positions the magnetic switch adjacent the top surface of the latch pocket, wherein the magnetic switch has a first state and a second state, wherein the override switch is movable between a first position and a second position, wherein when the override switch is moved to the second position the electrical component is switched to the second state, whereby the magnetic switch remains in the first state, wherein the override switch extends from an override switch housing that is connected to the circuit board, wherein the housing includes a switch opening defined in the bottom surface thereof, wherein the circuit board positions the override housing such that at least a portion of the override switch extends downwardly through the switch opening, and wherein the housing includes a cover that is positioned above the circuit board.

10. The method of claim 9 wherein the switch assembly is positioned in a header of a doorframe, and wherein the latch bolt extends upwardly from an aircraft lavatory door.

* * * * *